US011553687B2

(12) United States Patent
Roberson et al.

(10) Patent No.: US 11,553,687 B2
(45) Date of Patent: Jan. 17, 2023

(54) DEVICES FOR ANALYZING ANIMAL BEHAVIOR

(71) Applicant: Children's Medical Center Corporation, Boston, MA (US)

(72) Inventors: David P. Roberson, Cambridge, MA (US); Lee Barrett, Medford, MA (US)

(73) Assignee: Children's Medical Center Corporation, Boston, MA (US)

( * ) Notice: Subject to any disclaimer, the term of this patent is extended or adjusted under 35 U.S.C. 154(b) by 96 days.

(21) Appl. No.: 16/608,086

(22) PCT Filed: May 12, 2017

(86) PCT No.: PCT/US2017/032473
§ 371 (c)(1),
(2) Date: Oct. 24, 2019

(87) PCT Pub. No.: WO2018/208319
PCT Pub. Date: Nov. 15, 2018

(65) Prior Publication Data
US 2020/0060225 A1 Feb. 27, 2020

(51) Int. Cl.
*A01K 1/03* (2006.01)
*A01K 1/00* (2006.01)
(Continued)

(52) U.S. Cl.
CPC ............ *A01K 1/031* (2013.01); *A01K 1/0052* (2013.01); *A01K 1/0064* (2013.01); *A01K 29/005* (2013.01); *G03B 15/02* (2013.01)

(58) Field of Classification Search
CPC .... A01K 1/0052; A01K 1/0064; A01K 1/031; A01K 29/005; G03B 15/02
(Continued)

(56) References Cited

U.S. PATENT DOCUMENTS 3,098,465 A * 7/1963 Lvey ..................... A61D 3/00
119/417
3,177,848 A * 4/1965 Rubricius ................ A01K 1/03
119/458
(Continued)

FOREIGN PATENT DOCUMENTS

CA 2928972 A1 5/2015
CN 201019748 Y 2/2008
(Continued)

OTHER PUBLICATIONS

International Search Report and Written Opinion for International Application No. PCT/US2017/032473, dated Nov. 28, 2017.
(Continued)

*Primary Examiner* — Brady W Frazier
*Assistant Examiner* — Madison Elizabeth Dittner
(74) *Attorney, Agent, or Firm* — Wolf, Greenfield & Sacks, P.C.

(57) ABSTRACT

A device and method for detecting and recording animal behavior is provided. The device includes an enclosure having first and second chambers, each of the chambers having exterior panels formed of an opaque material, at least one image capture device disposed in each of the first and second chambers, the at least one image capture device arranged to capture behavior data of one or more freely roaming rodents, and a first container insertable into one of the first and second containers and positioned below a respective image capture device, the container having one or more corrals into which one or more rodents are housed during testing, the container being formed of a transparent material. In some embodiments, the first container is formed of a red transparent material, the one or more rodents being unable to see through the red transparent material.

21 Claims, 12 Drawing Sheets

(51) Int. Cl.
*A01K 29/00* (2006.01)
*G03B 15/02* (2021.01)
(58) Field of Classification Search
USPC .......................................................... 119/421
See application file for complete search history.

(56) References Cited

U.S. PATENT DOCUMENTS

| | | | |
|---|---|---|---|
| 3,584,927 A * | 6/1971 | Ott .............................. | B01L 1/02 250/458.1 |
| 3,830,146 A * | 8/1974 | Kaiser ................... | A01K 1/0064 454/255 |
| 3,974,798 A | 8/1976 | Meetze, Jr. | |
| 4,574,734 A | 3/1986 | Mandalaywala et al. | |
| 4,858,621 A | 8/1989 | Franks | |
| 4,968,974 A | 11/1990 | Sakano | |
| 5,134,969 A * | 8/1992 | Mason .................... | A01K 1/031 119/472 |
| 6,234,115 B1 * | 5/2001 | Blum .................... | A01K 1/0107 119/417 |
| 6,318,295 B1 * | 11/2001 | Wade ........................ | A01K 1/03 119/421 |
| 6,357,394 B1 * | 3/2002 | Waters ..................... | A01K 1/03 119/417 |
| 6,678,413 B1 | 1/2004 | Liang et al. | |
| 6,953,266 B1 * | 10/2005 | Ver Hage ............... | A01K 1/031 119/452 |
| 7,044,082 B1 | 5/2006 | Hewett et al. | |
| 7,068,842 B2 | 6/2006 | Liang et al. | |
| 7,487,744 B1 * | 2/2009 | Goldberg ............... | A01K 1/031 119/453 |
| 8,485,133 B1 | 7/2013 | Osmekhin et al. | |
| 8,514,236 B2 | 8/2013 | Kobla et al. | |
| 8,634,635 B2 | 1/2014 | Bai et al. | |
| 8,985,056 B2 * | 3/2015 | Chen .................... | A01K 67/033 119/417 |
| 9,282,725 B2 * | 3/2016 | Jensen-Jarolim ...... | A01K 1/031 |
| 9,901,070 B2 * | 2/2018 | Romney ............ | G07C 9/00571 |
| 10,238,085 B2 | 3/2019 | Woolf et al. | |
| 10,905,094 B2 * | 2/2021 | Salem .................... | A01K 1/031 |
| 2003/0004652 A1 | 1/2003 | Brunner et al. | |
| 2003/0055362 A1 | 3/2003 | Hampton | |
| 2003/0206287 A1 | 11/2003 | McClurg et al. | |
| 2004/0245477 A1 * | 12/2004 | Matsuda .............. | A01K 29/005 250/458.1 |
| 2005/0163349 A1 | 7/2005 | Brunner et al. | |
| 2006/0107066 A1 | 5/2006 | Cova et al. | |
| 2006/0201439 A1 * | 9/2006 | Ficker .................... | A01K 1/031 119/416 |
| 2007/0021421 A1 | 1/2007 | Hampton | |
| 2007/0079765 A1 * | 4/2007 | Carter .................... | A01K 1/031 119/456 |
| 2007/0272166 A1 * | 11/2007 | Kanno .................... | A61B 5/097 119/420 |
| 2010/0000473 A1 * | 1/2010 | Ver Hage ............... | A01K 1/031 119/500 |
| 2010/0111359 A1 | 5/2010 | Bai et al. | |
| 2010/0143265 A1 | 6/2010 | Hewes et al. | |
| 2010/0175629 A1 | 7/2010 | Garmon | |
| 2010/0217157 A1 | 8/2010 | Tasch | |
| 2010/0246902 A1 | 9/2010 | Rowe et al. | |
| 2010/0317094 A1 | 12/2010 | Ricco et al. | |
| 2012/0180731 A1 | 7/2012 | Garner et al. | |
| 2012/0255500 A1 * | 10/2012 | Dixon .................. | A61B 5/4827 119/421 |
| 2012/0293631 A1 | 11/2012 | Schwarz et al. | |
| 2014/0251228 A1 | 9/2014 | Jensen-Jarolim et al. | |
| 2015/0208607 A1 * | 7/2015 | Vaccari .................... | A01K 1/02 119/455 |
| 2016/0150758 A1 | 6/2016 | Salem et al. | |
| 2016/0270364 A1 | 9/2016 | Woolf et al. | |
| 2016/0300123 A1 | 10/2016 | Jewell et al. | |
| 2017/0064929 A1 | 3/2017 | Yakovenko | |
| 2017/0111128 A1 | 4/2017 | Hammerschmidt | |
| 2017/0351898 A1 | 12/2017 | Zhang | |
| 2018/0084754 A1 * | 3/2018 | Tominaga ................ | A01K 1/03 |
| 2018/0260645 A1 | 9/2018 | Roberson et al. | |
| 2019/0080158 A1 | 3/2019 | Roberson et al. | |
| 2019/0261596 A1 | 8/2019 | Woolf et al. | |

FOREIGN PATENT DOCUMENTS

| | | | |
|---|---|---|---|
| WO | WO 03/025615 A2 | 3/2003 | |
| WO | WO 2005/001768 A1 | 1/2005 | |
| WO | WO 2007/071572 A1 | 6/2007 | |
| WO | WO-2015066460 A2 * | 5/2015 | ............. A01K 1/031 |

OTHER PUBLICATIONS

International Preliminary Report on Patentability for International Application No. PCT/US2017/032473, dated Nov. 21, 2019.
[No Author Listed] Automatic Footprint Classification. Noldus. Last Accessed on Oct. 24, 2013 at http://www.noldus.com/CatWalk-XT/automatic-footprint-classification 1 page.
[No Author Listed] Behavioral Research Blog—CatWalk gait analysis versus treadmills. Noldus. http://info.noldus.com/bid/93553/CatWalk-gait-analysis-versus-treadmills. Retrieved from the WayBack Machine on Aug. 29, 2016, noting date of May 13, 2013, 2 pages.
[No Author Listed] CatWalk 7.1 versus CatWalk XT. Noldus. http://www.noldus.com/catwalk-71-versus-catwalk-xt-81; Retrieved from the WayBack Machine on Aug. 29, 2016, noting date of Oct. 24, 2013. 2 pages.
[No Author Listed] CatWalktmXT. Noldus. Last Accessed on Oct. 24, 2013 at http://www.noldus.com/animal-behavior-research/products/catwalk2 pages.
[No Author Listed] Discover CatWalk XT. Noldus. http://www.noldus.com/CatWalk-XT/specifications#; Retrieved from the WayBack Machine on Aug. 29, 2016, noting date of Oct. 24, 2013. 3 pages.
[No Author Listed] Illuminated Footprints Technology. http://www.noldus.com/CatWalk-XT/illuminated-footprints-technology; Retrieved from the WayBack Machine on Aug. 29, 2016, noting archive date of Oct. 24, 2013. 1 page.
[No Author Listed] New! CatWalk XT 10.5. Noldus. http://www.noldus.com/CatWalk-XT/new-features; Retrieved from the WayBack Machine on Aug. 29, 2016, noting date of Oct. 24, 2013. 4 pages.
[No Author Listed] Noldus—List of publications. Last Accessed on Oct. 24, 2013 at http://www.noldus.com/content/list-publications 3 pages.
Angeby-Möller et al., Using the CatWalk method to assess weight-bearing and pain behaviour in walking rats with ankle joint monoarthritis induced by carrageenan: effects of morphine and rofecoxib. J Neurosci Methods. Sep. 15, 2008;174(1):1-9. doi: 10.1016/j.jneumeth. 2008.06.017.
Betts et al., A device for measuring plantar pressures under the sole of the foot. IMechE. 1978;7(4):223-8.
Chen et al., Detection of subtle neurological alterations by the Catwalk XT gait analysis system. Journal of neuroengineering and rehabilitation. Dec. 2014;11(1):62.
Koopmans, CatWalk: the next step in gait analysis. Noldus. http://www.noldus.com/documentation/80; Retrieved from the WayBack Machine on Aug. 29, 2016, noting date of Oct. 24, 2013. 1 page.
Roedel et al., Effects of light or dark phase testing on behavioural and cognitive performance in DBA mice. Lab Anim. 2005;40:371-81.
Vrinten et al., 'CatWalk' automated quantitative gait analysis as a novel method to assess mechanical allodynia in the rat; a comparison with von Frey testing. Pain. Mar. 2003; 102(1-2):203-9.
U.S. Appl. No. 16/275,810, filed Feb. 14, 2019, Woolf et al.
U.S. Appl. No. 15/760,768, filed Mar. 16, 2018, Roberson et al.
U.S. Appl. No. 15/760,792, filed Mar. 16, 2018, Roberson.
PCT/US2017/032473, Nov. 28, 2017, International Search Report and Written Opinion.
PCT/US2017/032473, Nov. 21, 2019, International Preliminary Report on Patentability.

* cited by examiner

DEVICES FOR ANALYZING ANIMAL BEHAVIOR

RELATED APPLICATIONS

This application is a national stage filing under 35 U.S.C. § 371 of International Application No. PCT/US2017/032473, entitled "DEVICES AND METHODS FOR ANALYZING ANIMAL BEHAVIOR" and filed May 12, 2017, the entire contents of which is incorporated herein by reference.

FIELD

Devices and methods for analyzing animal behavior are disclosed.

BACKGROUND

Animal behavior detection and analysis may be a useful experimental tool, for example, to determine whether a certain medication, stimulus or environment has a consequence on the animal's behavior. Such information can be useful in developing treatments for use in other animals, including humans. Such a tool also may be used for diagnostic purposes, for example, to identify a physical ailment in an animal, such as a human.

SUMMARY

According to one embodiment, a device for recording animal behavior is disclosed. The device includes an enclosure having first and second chambers, each of the first and second chambers having exterior panels formed of an opaque material, at least one image capture device disposed in each of the first and second chambers, the at least one image capture device arranged to capture behavior data of one or more freely roaming rodents, and a first container insertable into one of the first and second chambers and positioned below a respective image capture device, the container having one or more corrals into which one or more rodents are housed during testing, the container being formed of a transparent material.

According to another embodiment, a method of recording animal behavior is disclosed. The method includes providing an enclosure having first and second chambers, each of the first and second chambers having exterior panels formed of an opaque material and a base, placing a first container onto the base of the first chamber, the first container having one or more corrals for housing one or more rodents, the first container formed of a transparent material, and recording the behavior of the one or more rodents via an image capture device disposed in the first chamber and positioned above the first container.

According to another embodiment, a device for recording animal behavior is disclosed. The device includes a container having one or more corrals into which one or more rodents are housed during testing, the container being formed of a red transparent material, the one or more rodents being unable to see through the red transparent material, and an image capture device disposed above the container, the image capture device arranged to capture behavior data of one or more freely roaming rodents.

According to still another embodiment, a device for recording animal behavior is disclosed. The device includes an enclosure having first and second chambers, each of the first and second chambers having exterior panels formed of an opaque material and a base, a first container insertable into one of the first and second chambers and positioned on the respective base, the container having one or more corrals into which one or more rodents are housed for testing, the container being formed of a transparent material, the container having a base surface that is sensitive to a footprint of the animal, and an image capture device cooperating with the base surface to capture both a profile of a full footprint of the animal.

According to another embodiment, a method of recording animal behavior. The method includes providing an enclosure having first and second chambers, each of the first and second chambers having exterior panels formed of an opaque material and a base, placing a first container onto the base of the first chamber, the first container having one or more corrals for housing one or more rodents, the first container formed of a transparent material, a base surface of the first container being sensitive to a footprint of the animal, and observing a resulting behavior of the one or more rodents via imaging profiles of foot prints and a profiles of toe prints of the one or more rodents.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
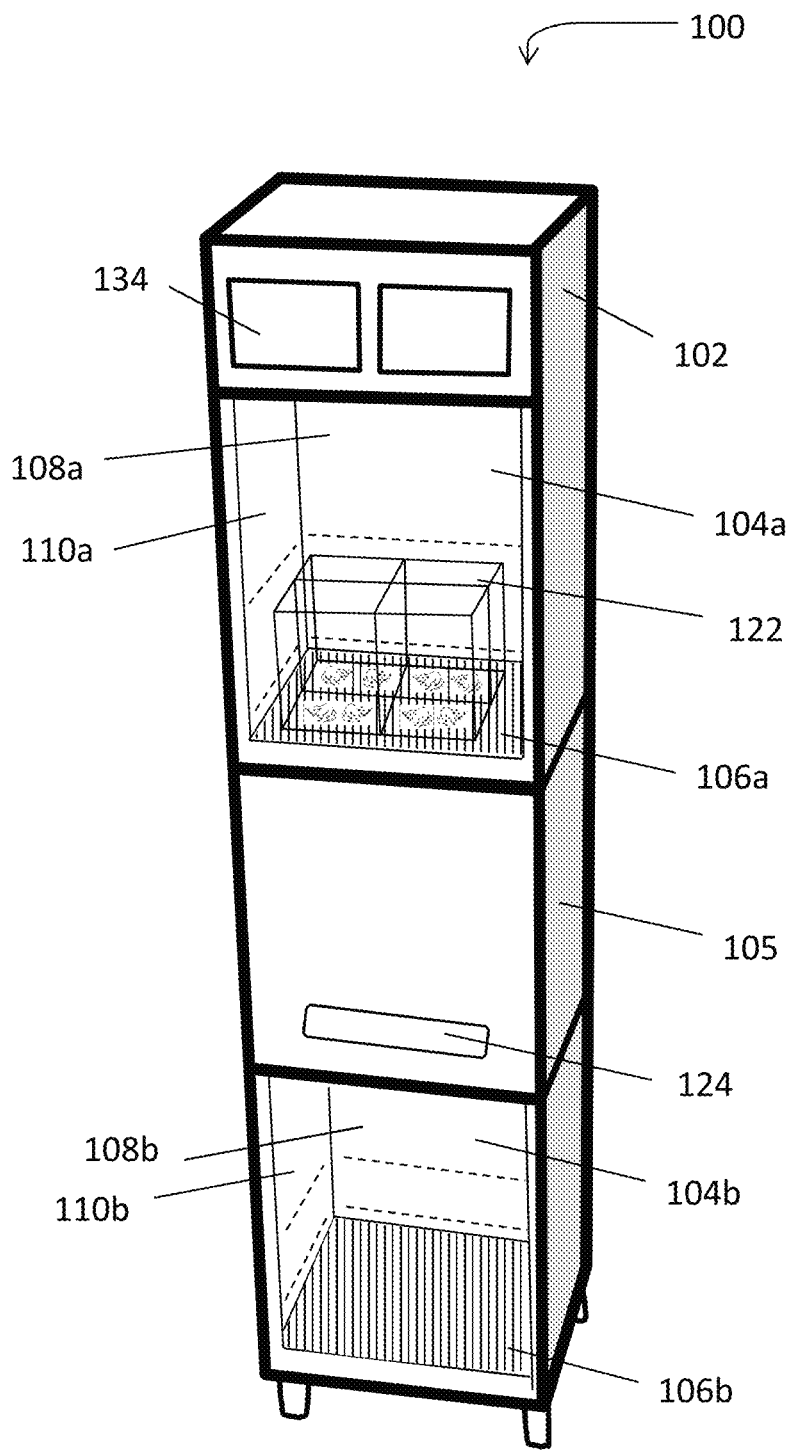
FIG. 1 is a perspective view of a device for monitoring animal behavior according to one embodiment.

Valuable information can be learned in laboratory studies by monitoring and analyzing the activity and motor performance of animals, such as rodents. One such application is the identification and analysis of scratching, cheek wiping, flinching, rearing or other anthropomorphically defined behaviors. For example, changes in the rodents may accompany the rodents' reactions to certain stimuli or social interaction (e.g., social anxiety).

Traditionally, scientific investigators capture videos of rodent behavior by placing mice or rats in a rectangular transparent container and recording the behavior of the mice or rats. In some instances, the investigators record the behavior by journaling behavior observed during in-person watching of the rodents in the container. In other instances, conventional videography equipment may be used to record the behavior of the rodents. For example, an investigator may use a tripod-mounted consumer video camera, and existing room lighting, to record rodent behavior.

The inventors have recognized that setting up and tearing down conventional videography equipment used for such recordings is time consuming. Additionally, scientific investigators who use this equipment are typically not trained in videography or photography and, as such, the quality of the video recordings are typically very poor due to sub-optimal lighting and/or poor camera setup. For example, the camera may be placed in a location such that a blind spot is observed when reviewing the video recording. In some embodiments, poor video quality makes the scoring and interpretation of such data unnecessarily difficult.

The inventors have also realized that improved data may be achieved by limiting or even excluding environmental distractions that could adversely impact rodent behavior. For example, rodents may not behavior normally when there are investigators in the room, if there is external lighting, and/or if other rodents are present in adjacent testing stations. In this regard, testing data may be improved by monitoring nocturnal behavior or rodents, such as during the nighttime period when rodents are the most active, and when the rodents are isolated.

The inventors have also recognized that by monitoring the activity of freely behaving rodents, either individually or in groups, advantages may be realized. In some embodiments, the behavior of rodents may be monitored after one or more rodents have been genetically modified and/or have been subjected to different types of stimulus.

Accordingly, embodiments disclosed herein include a device for observing rodent behavior, the device including one or more enclosed chambers into which rodents may be placed. In some embodiments, the one or more chambers have exterior panels that are formed of an opaque material, such as an opaque plastic or aluminum. In some embodiments, to facilitate observation of nocturnal behavior, the chamber may be illuminated using red, near-infrared or other lighting that is not visible to rodents. Without wishing to be bound by theory, as certain wavelengths of lights are not visible to rodents, the rodents may be observed while being left undisturbed. In these embodiments, the rodents may be isolated from certain environmental "distractions" while the testing is being conducted.

In some embodiments, the rodents are maintained in a container having one or more corrals, the rodent-filled container being placed inside one of the chambers during testing. It should be noted that such a corral is not limited to an outdoor area for large animals; rather, as contemplated herein, a corral can be a test chamber for use with small animals, such as rodents.

In some embodiments, the container is formed of a red transparent material. In some embodiments, the transparency of the material allows the rodents in the corrals to be illuminated and observed for monitoring. As noted above, in instances in which the chamber may be illuminated using red, near-infrared or other lighting that is not visible to rodents, the rodents may move undisturbed while still being visible to the investigators. In some embodiments, by using a red material, since rodents are unable to view red light (e.g., the rodents do not have red photoreceptors), rodents in a first corral will be unable to see through the walls of the container into a neighboring corral. In that regard, animals in a first corral may be isolated from distractions caused by additional testing being performed at the same time.

In some embodiments, the device includes one or more image capture devices, such as video cameras, to capture rodent behavior. In such embodiments, an image capture device may be placed above the rodent-filled container in the chamber to record rodent behavior.

As will be appreciated, the device also may be arranged to monitor other types of behaviors. For example, the device may be arranged to capture voluntary and evoked movement of the freely behaving rodents by producing images of topographic features representing an inferior surface of the rodents. In some embodiments, this includes the spatial extent, intensity and dynamic changes of the surface. The inferior surface of the rodents may include a paw print, a toe print, or any other suitable inferior surface of the animal, e.g., a rodents' abdomen or tail.

In some embodiments, the container may include a horizontal contact sensor positioned above a second image capture device. In some embodiments, the contact sensor is a horizontal, transparent sensor. During experimentation, the rodents may be placed in the container and directly on top of the sensor, thus permitting the animal to roam freely on top of the sensor while being video recorded from below.

The sensor may be constructed based on the phenomenon of frustrated total internal reflection (FTIR) of band light. In some embodiments, the sensor is constructed based on FTIR of a non-visible band light, such as near-infrared, infrared, or ultraviolet light, although other suitable band light may be employed as this aspect of the disclosure is not limited in this regard. In one embodiment, the contact sensor includes a horizontally-positioned transparent glass or acrylic panel with a light source in the non-visible range. For example, infrared LED lights may be positioned around the perimeter of the panel (e.g., as strip lights or as lights mounted in a channel of a removable rail). Without wishing to be bound by theory, when the light strikes the medium boundary between the glass panel and the ambient air above the panel at an angle larger than the critical angle, the light is totally internally reflected and no light is emitted towards the camera below. Again, without wishing to be bound by theory, when an object, such as a mouse paw pad, having a higher refractive index than air comes within several wavelengths distance of the glass/air boundary, the evanescent wave passes light energy into the object, making it visible to the camera below. Stated another way, when the object, e.g. the mouse paw, comes into contact with the panel, the evanescent light field generated by the internally reflected light is "frustrated" and refracted out of the glass panel where it can be detected by a camera positioned below the glass panel. In some embodiments, the intensity, contact area, spatial extent and position of the "frustrated" light signal and its change over time facilitates determining the physical and physiological aspects of the animal's behavior, such as the relative weight borne on each paw or the distribution of weight within each footprint. This, in turn, may provide an objective readout relating to the subjective experience of the animal.

In some embodiments, the device also may be arranged to deliver different types of stimulus to the freely roaming rodents and to examine the rodents' behavioral responses after application of the stimulus. In some embodiments, the stimulus includes thermal, mechanical, electric, audio, olfactory or smell, textural, or light stimulation, although other types of stimulation may be employed. In some embodiments, the stimulus is delivered via the sensor, although the stimulus may be delivered via other methods. A skilled artisan should appreciate that more than one stimulus (whether simultaneous or sequential) may be applied to a single animal during the course of an experiment. A person having skill in the art should further appreciate that different stimuli may be applied to each of the animals in a study when multiple animals are being tested.

In some embodiments, light stimulus may be delivered through the surface of the panel or sensor. For purposes herein, light stimulus may include the application of light to stimulate a genetically engineered, light sensitive animal and the application of light as a visual stimulus for any animal. For example, light stimulus may be applied by directing specific wavelengths of laser generated light at points on the animal body (e.g., the footpads) using a scanning mirror galvanometer or other laser pointing devices, or via LED arrays positioned below the sensor and generating specific light wavelengths directed through the sensor to the entire inferior surface of the animal body. Light stimulus also may be applied via LED arrays generating specific wavelengths of light that can be positioned to generate FTIR of light that is then delivered to the surfaces of the rodent body in contact or nearby the sensor. Without wishing to be bound by theory, delivery of light using these methods may permit control of specific peripheral nerve activity or cell function using light as stimulus while simultaneously imaging the mouse to acquire and analyze behavior data related to the light-activated nerve or cell activity. For example, light stimulus can be used for the manipulation of genetically encoded light-sensitive proteins to study function of molecules, synapses, cells and system or other light sensitive molecules engineered to interact or bind to cellular proteins. Also as an example, the expression of naturally occurring light-gated proteins (e.g., channelrhodopsins) or the introduction of light sensitive molecules in defined subsets of cells or proteins can address important questions about cells and systems into which they are introduced since they allow cellular activity, such as the activation of specific cell types or the opening of specific ion channels, to be performed in a targeted manner by the administration of light. Also, a chemical that binds to proteins and makes them light sensitive may be used. The applied light may be applied in different temporal patterns, different sizes and intensities for different durations in order to activate or inhibit specific neurons, proteins or receptors.

In some embodiments, the surface temperature of the sensor may be manipulated to explore behavioral responses to a thermal stimulus. In some embodiments, the glass or panel may have a thermally conductive layer or a thermally conductive plate may be used. The temperature also may be varied via an infrared heat source or via an infrared light source. In some embodiments, the temperature may be manually adjusted whereas in other embodiments it may be automatically adjustable. In some embodiments, the surface upon which the animal is freely roaming may have one or more textures to stimulate the animal.

Turning now to the figures FIG. 1 shows a device 100 for detecting and recording animal behavior according to embodiments of the present disclosure. As shown in this view, the device includes an enclosure 102 with first and second chambers 104a, 104b for housing rodents to be monitored. In some embodiments, the enclosure also may include a non-testing chamber 105 located between the first and second chambers 104a, 104b. Such an intermediate chamber may be used to house equipment for testing, such as an image capture device, and/or one or more of the chamber doors.

Figure 2:
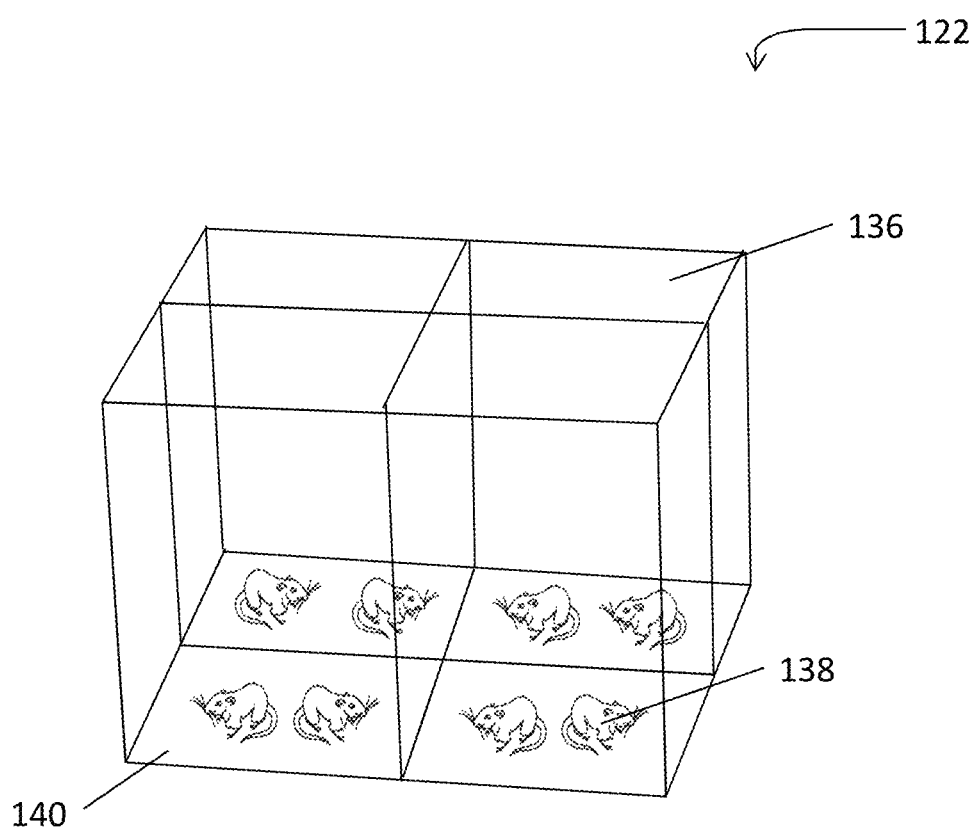
FIG. 2 is a perspective view of a container having corrals for holding rodents according to one embodiment.

In some embodiments, a container 122 (see FIGS. 1 and 2) holding one or more rodents may be inserted into one or more of the chambers. As will be appreciated, although a single container 122 is shown in the first chamber 104a, in other embodiments, more than one container may be positioned in this chamber. Additionally, although a container is only shown in the first chamber, containers may be placed into both the first and second containers.

As will be appreciated, although the enclosure includes two testing chambers in these embodiments, in other embodiments, the enclosure may include only one chamber or may include more than two chambers. For example, the enclosure may include 2, 4, 6, 8, 10 or more chambers for housing rodents to be monitored.

Figure 3:
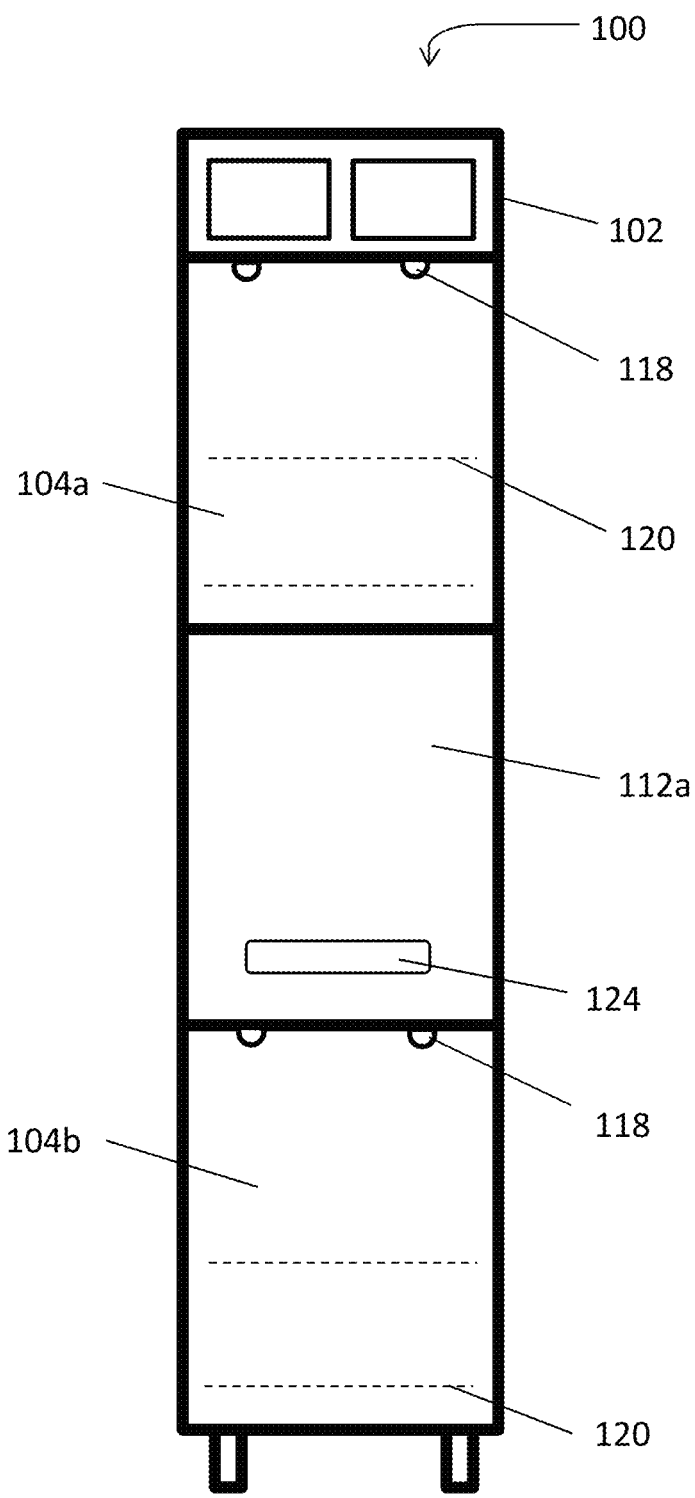
FIG. 3 is a front view of the device of FIG. 1, with first and second chambers being open.

In some embodiments, as shown in FIGS. 1 and 3, the first and second chambers may be vertically aligned, with the first and second chambers being arranged in a column. In such embodiments, the device 100 may be placed on a surface, such as the floor, for use. In other embodiments, the first and second chambers may be horizontally aligned. In such embodiments, the device may be placed on a surface, such as a lab bench, for use. As will be appreciated, in embodiments having more than 2 chambers, such as 4 or 6 chambers, the chambers may be arranged in columns and rows. For example, in a device having 6 chambers, the device may include three column, with two chambers per column, or three rows, with two chambers per row.

In some embodiments, as shown in FIGS. 1 and 3, each of the chambers may have a substantially rectangular cross sectional shape. In such embodiments, the chambers may have a substantially cuboid shape. As will be appreciated, the chambers may have other shapes in other embodiments. For example, the chambers may have a substantially square cross sectional shape, with an overall cube shape. The chambers also may be substantially cylindrical in shape. Other suitable shapes for the chamber also may be used.

As shown in FIG. 1, each chamber 104a, 104b has a respective base 106a, 106a, onto which rodents may be placed for monitoring, such as in the container 122. In some embodiments, the base may be a solid base, such as a solid piece of glass or plastic. In some embodiments, the base may be transparent, although the base also may be opaque in some embodiments. In some embodiments, the base may include a plurality of parallel bars. As will be appreciated, other suitable bases may be used in other embodiments.

In some embodiments, as shown in FIG. 1, the base may be fixedly attached to the enclosure 102. For purposes herein, being fixedly attached to the enclosure may mean that the base is screwed, glued or otherwise attached to the enclosure such that base is not removable from the enclosure without the use of tools. In other embodiments, the base may be removable from the enclosure. For example, the base may be slidable relative to the enclosure. In such an example, the investigator may slide at least part of the base out of the enclosure to place the container onto the base, and then may slide the base back into the enclosure. The base also may be removably attachable such that the investigator may remove the base for cleaning.

Figure 5:
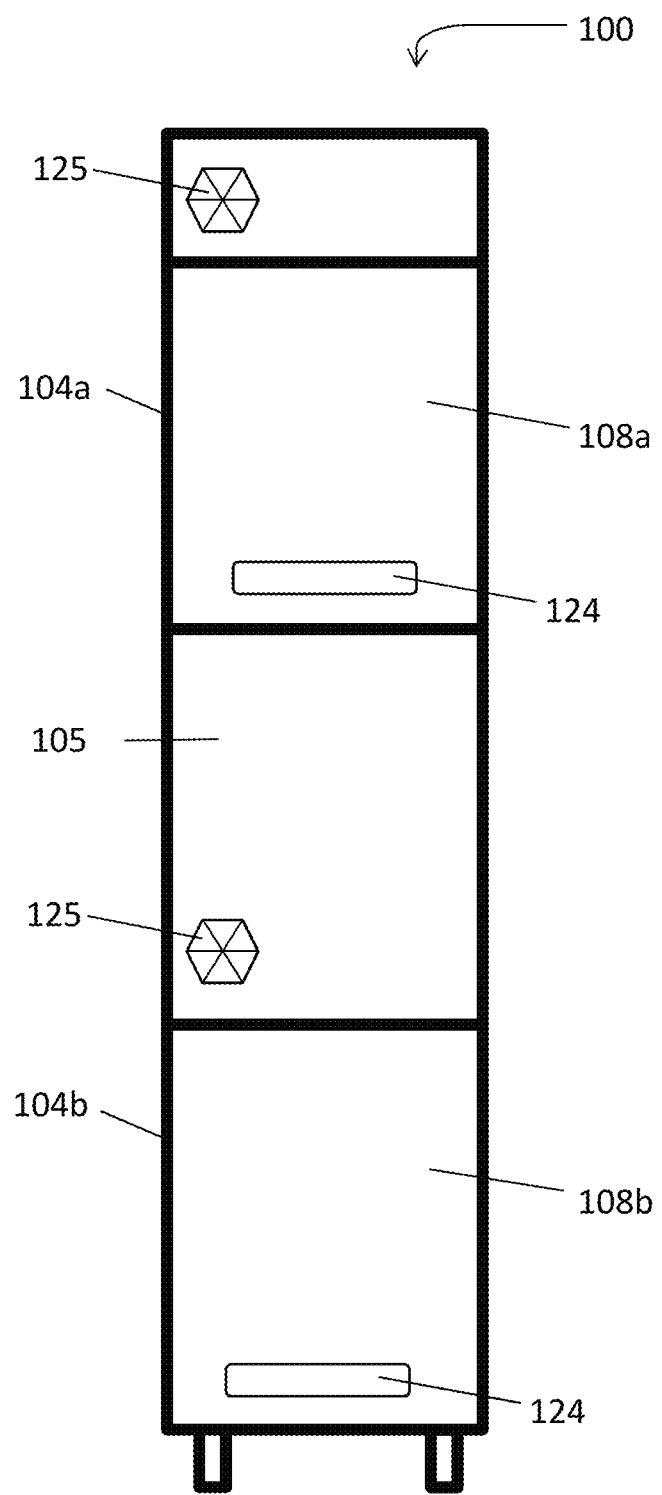
FIG. 5 is a rear view of the device of FIG. 1.

As shown in FIGS. 1, 3 and 5, each chamber includes a respective rear panel 108a, 108b and respective side panels 110a, 110b. In some embodiments, the side and rear panels may be fixedly attached to the enclosure. The side and rear panels also may be integrally formed with one another. In some embodiments, the side and rear panels are removably attachable to the enclosure. For example, the side and/or rear panel may be slidably received in a groove in the enclosure. In this regard, the side and/or rear panel may be removable from the enclosure, such as if a repair is necessary. For example, one of the panels may be removable to repair and/or replace faulty lights attached thereto.

In some embodiments, the exterior panels of each chamber are formed of opaque materials, such as opaque plastic or metal (e.g., aluminum), although other suitable materials may be used. In some embodiments, the outer panel may include a material that has been painted a dark color, such as black. In such embodiments, as will be appreciated, the opaque material may prevent outside distractions, such as light or the presence of investigators in the same room to be observed by the rodents being monitored. In this regard, the investigators need not leave the testing room during testing and/or need not turn off the lights in the room.

Figure 4:
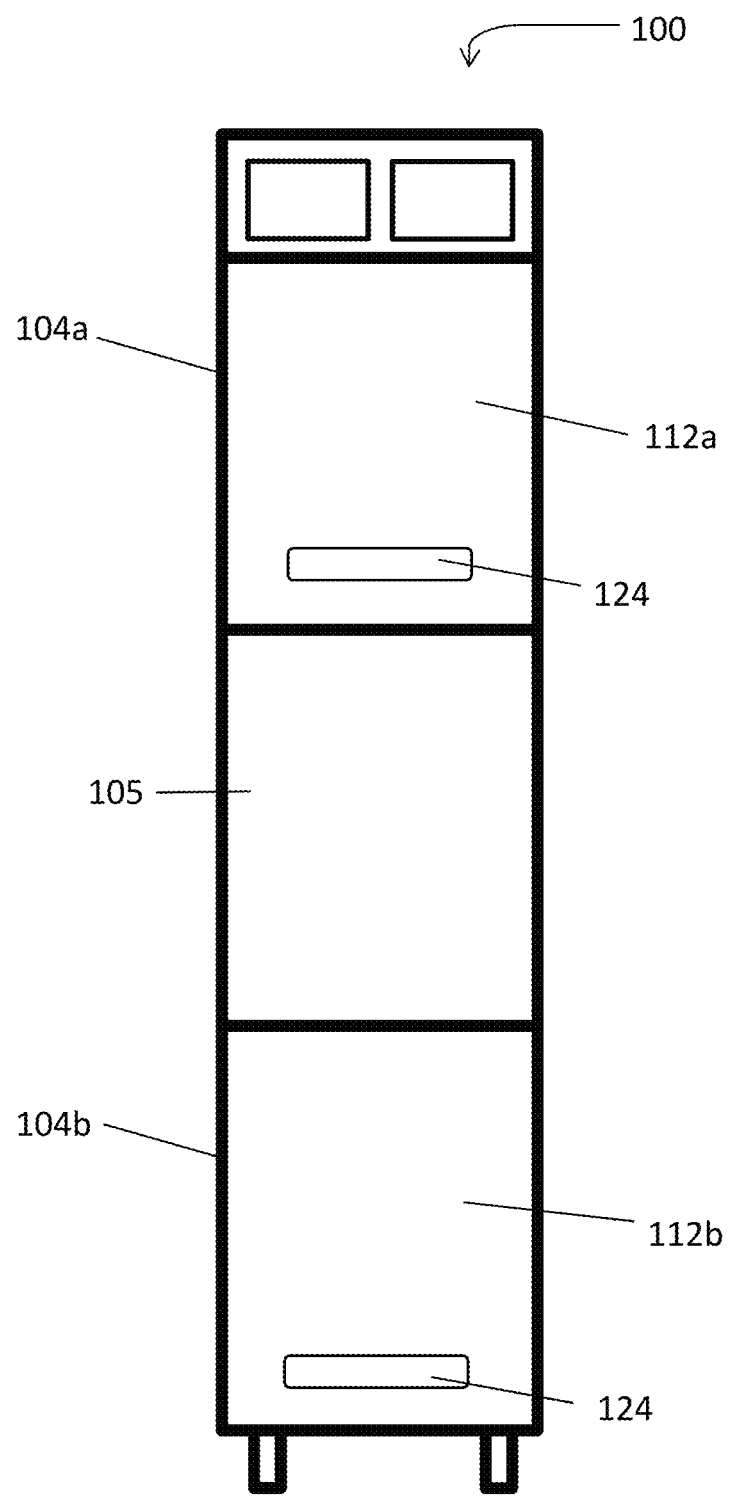
FIG. 4 is a front view of the device of FIG. 1, with the first and second chambers closed.
Figures 6A, 6B:
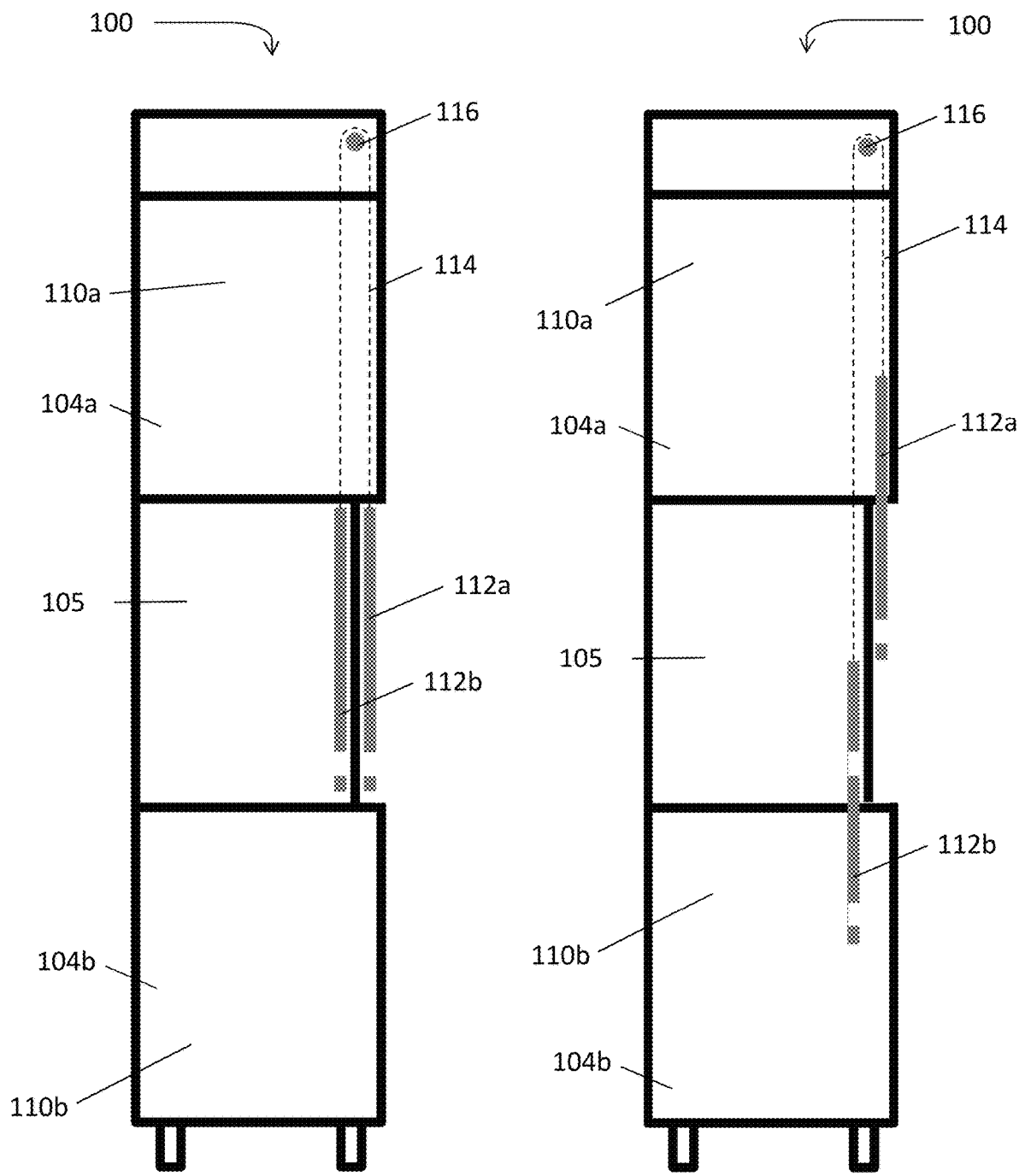
FIG. 6A is a cross-sectional side view of a device for monitoring animal behavior, with chamber doors in an open position.
FIG. 6B shows the device of FIG. 6A, with the chamber doors in an intermediate position.
Figure 6C:
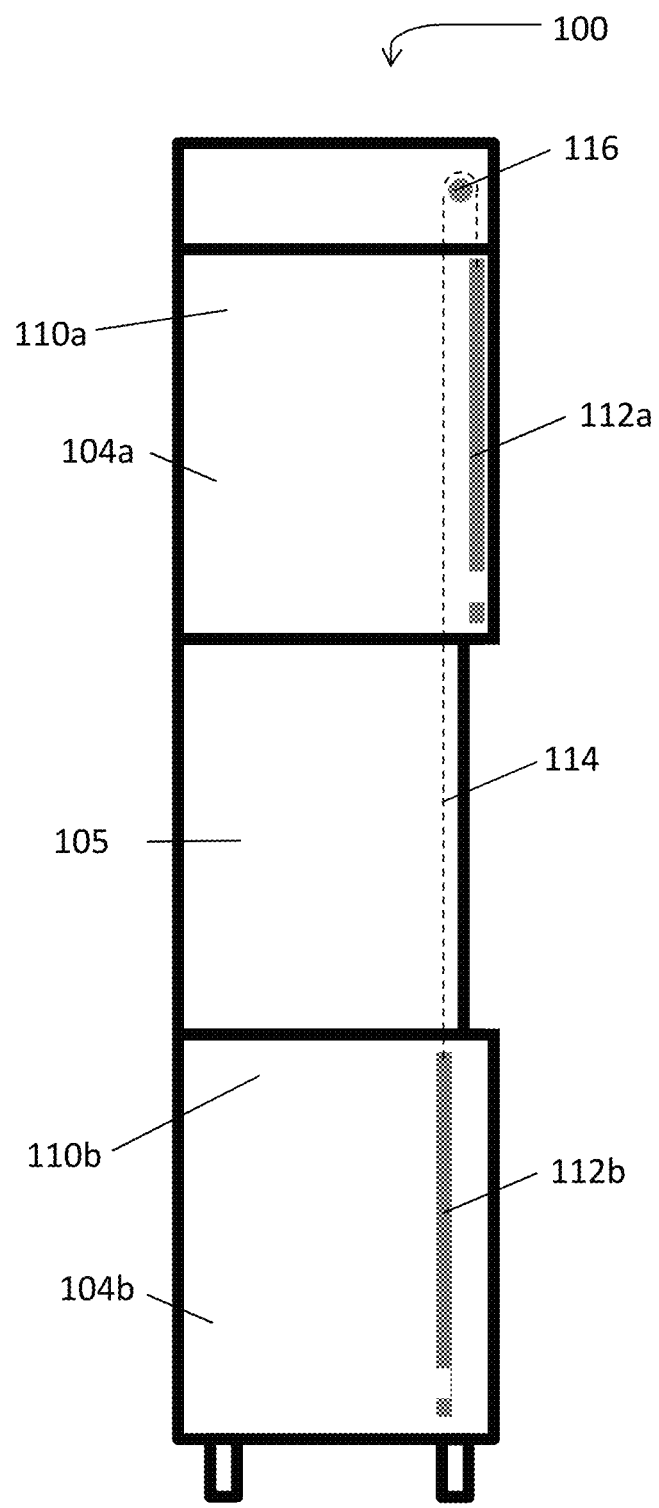
FIG. 6C shows the device of FIG. 6A, with the chamber doors in a closed positions.

As shown in FIG. 4, the chambers also include a front panel, which in some embodiments may include a chamber door 112a, 112b. Such doors may be moveable between open and closed positions to open and close the respective chambers, as will be described. As shown in FIGS. 3 and 6A, for example, in some embodiments, the doors 112a, 112b may be positioned in front of and/or inside of the intermediate chamber 105 when the doors are in the open position. As shown in FIGS. 6B and 6C, the doors may be selectively moved from the open position to the closed position prior to monitoring the one or more rodents in the chamber. In the closed position, as shown in FIG. 6C, the doors 112a, 112b are positioned in front of the respective chambers 104a, 104b.

In some embodiments, as shown in FIGS. 6A-6C, the first and second doors 112a, 112b may be attached to one another via a pulley system. In such embodiments, the doors may be attached to one another such that the doors may be offset with respect to one another when the doors are moved between the open and closed positions. For example, as shown in these views, movement of a first door in an upward direction to close the first chamber may drive movement of the second door in a downward direction to close the second chamber.

As shown in FIGS. 6A-6C, as part of this pulley system, the first and second doors 112a, 112b may be attached to one another via a cord 114 or cable, the cord being passed through the pulley 116 located near a top of the enclosure 102. As will be appreciated, the cable may extend over a grooved rim of the wheel of the pulley, such that the doors may be slid between the open and closed position. In some embodiments, the doors may be attached to one another via a single pulley. For example, the cord may extend along a first side of the enclosure. In other embodiments, the doors may be attached to one another via more than one pulleys.

For example, pulley systems may extend along first and second sides of the enclosure. As will be appreciated, although the pulley is shown as being located at the top of the enclosure in these embodiments, the pulley may be located at a bottom of the enclosure. In such embodiments, the cord connecting the doors and extending through the pulley may extend downwardly and through the pulley.

Although a pulley system is shown in FIGS. 6A-6C for opening and closing the doors, the doors may be attached to the enclosure via other suitable methods. For example, the doors may slide along tracks extending along the side of the enclosure. The doors also may be hingedly attached to the enclosure, at each respective chamber. In such embodiments, the doors may be pivoted between open and closed positions to open and close the chamber. As will be appreciated, other suitable methods may be used to attach the door to the enclosure.

Figure 7:
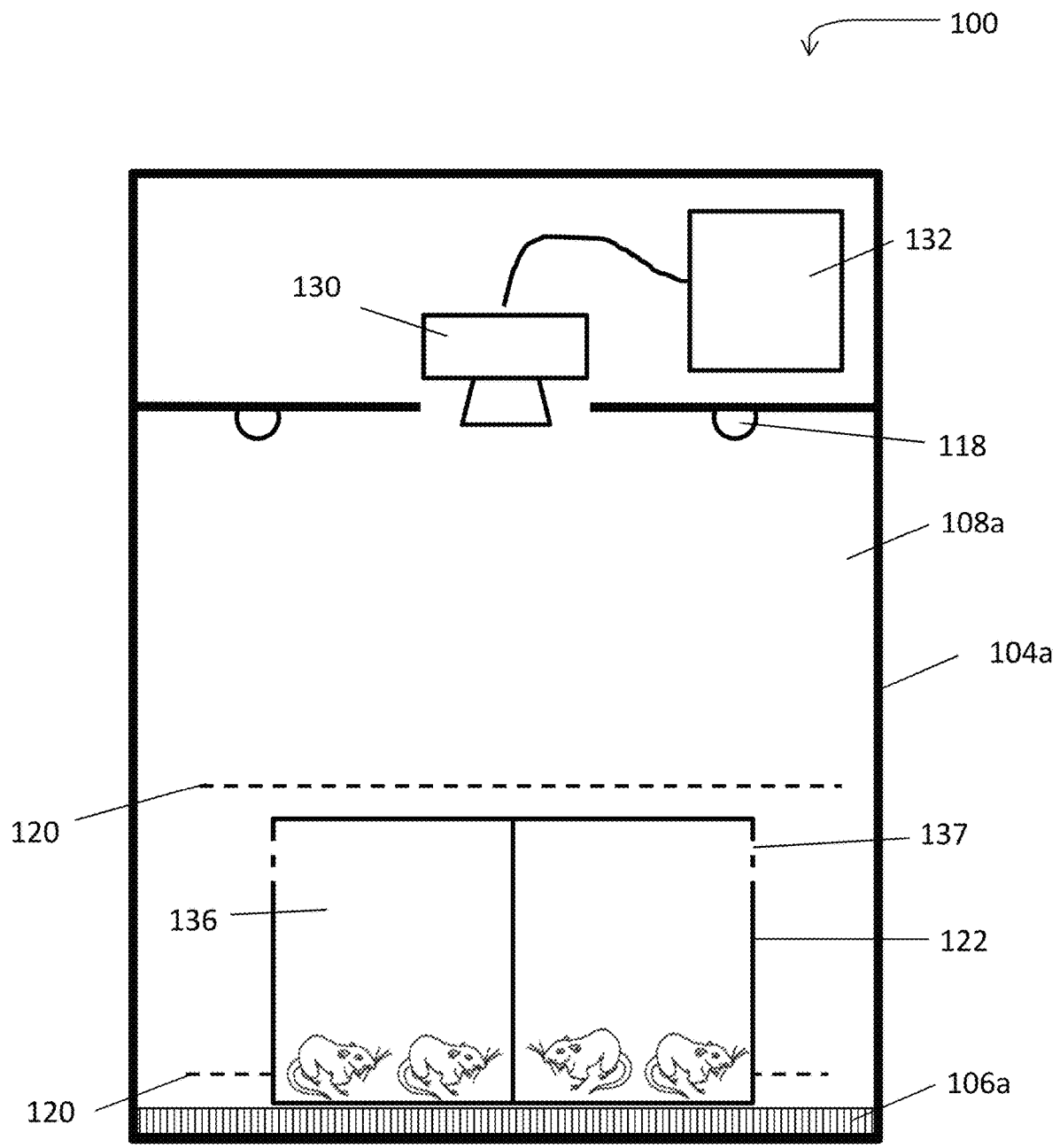
FIG. 7 is a cross-sectional schematic front view of a first chamber of a device for monitoring animal behavior.

Turning back to FIG. 3, in some embodiments, the enclosure 102 includes one or more lights 118 arranged to illuminate the chambers. In such embodiments, the lights 118 may emit a visible light that allows the investigators to arrange and operate the chamber. For example, the lights may allow the investigator to position the rodents on the base prior to testing and/or to clean the chamber. In some embodiment, as shown in FIGS. 3 and 7, the lights may be positioned at or near the top of the chamber. In some embodiments, as shown in these views, the chamber may include two lights, although the chamber may include only one light or may include more than two lights. The number of lights also may vary from chamber to chamber.

In some embodiments, the chambers may include testing lights 120, such as LEDs, that are positioned around the back and side panels (see FIGS. 1 and 3) of each chamber. In some embodiments, the testing lights 120 are arranged to emit light which may include a non-visible band light, e.g. near-infrared, infrared, or ultraviolet light, or another suitable type of light not visible by the rodents. In some embodiments, the lights 120 may be mounted in a channel, such as within a moveable rail. The lights also may be positioned as strip lights on the panels. As will be appreciated, in such embodiments, the lights may be attached such that the lights may be removable and replaceable. For example, if one or more lights attached to the rear panel fail, the investigator may remove just the lights on the rear panel and not all of the lights along the rear and side panels.

As shown in these views, in some embodiments, the chambers may include two strips of testing lights 120 along the rear and side panels. For example, as shown in FIGS. 1 and 7, a first strip of lights may be positioned at or near the base 106a, 106b of the chamber. In some embodiments, a second strip of lights may be positioned at or above a top of the container 122 holding the rodents being tested. As will be appreciated, although two strips of lights are shown in these embodiments, in other embodiments, the chambers may have only a single strip of lights, such as at or near the base of the chamber. The chamber also may have more than two strips of lights. As will be further appreciated, the number of strips of lights may be the same from chamber to chamber, although the number of strips of lights may vary from chamber to chamber.

In some embodiments, each of the lights 118, 120 may be selectively controlled by the investigator during testing. For example, the investigator may flip a switch to turn each of the lights 118, 120 off and on at desired times. In other embodiments, operation of the lights may be automatically controlled by movement of the doors between the open and closed positions. In this regard, the lights may be operatively coupled to the doors. For example, when the doors are in the open position, the lights 118 may be turned on to illuminate the chambers with a visible light. When the doors are moved into the closed position, the lights 118 may be turned off and the testing lights 120 may be turned on to illuminate the chamber with a non-visible light for monitoring.

As will be appreciated in view of the above, when the doors are closed for monitoring, the chambers are also closed. In this regard, in some embodiments, the enclosure includes one or more cooling elements to maintain the chambers at an appropriate temperature. Such cooling elements may be passive cooling elements or may be active cooling elements. For example, in some embodiments, as shown in FIG. 5, the enclosure may include a duct and corresponding fan 125 that draws air out of the back of the enclosure, such as for temperature modulation. As shown in this view, fans 125 may be located at an upper portion of the enclosure and on the rear panel of the intermediate chamber 105. In such embodiments, one of the fans may draw air out of the first chamber 104a, while the other fan draws air out of the second chamber 104b. Although the device includes two fans in this embodiment, in other embodiments, the device may have only one fan or may have more than two fans. As will be appreciated, the fans and corresponding ducts may be placed in any suitable location on the device. In some embodiments, an air intake cover or panel may be placed over the duct and/or fan such that air may be drawn into the fan and/or duct while not allowing environmental light (e.g., from outside of the enclosure) to penetrate into the chamber.

In some embodiments, the chambers also include one or more vents in one or more of the panels. For example, vents 124 may be located on each of the front doors 112a, 112b (see FIG. 4) and rear panels 108a, 108b (see FIG. 5) of the chambers. As will be appreciated, although two vents are shown for each chamber, the chambers may have only one vent or may have more than two vents. The vents also may be formed in other panels, such as in the side panels. Additionally, although the vents are shown as being located at a bottom portion of the panels, the vents may be located at other suitable portions of the panel.

As will be appreciated, the vents 124 may have any suitable shape. For example, the vents may be substantially rectangular in shape, although the vents may be square, circular, another polygonal or another suitable shape. As will be further appreciated, although one vent is shown on each of the panels (e.g., one vent on each of the front and rear panels), each panel may have two or more vents in other embodiments.

Figure 8:
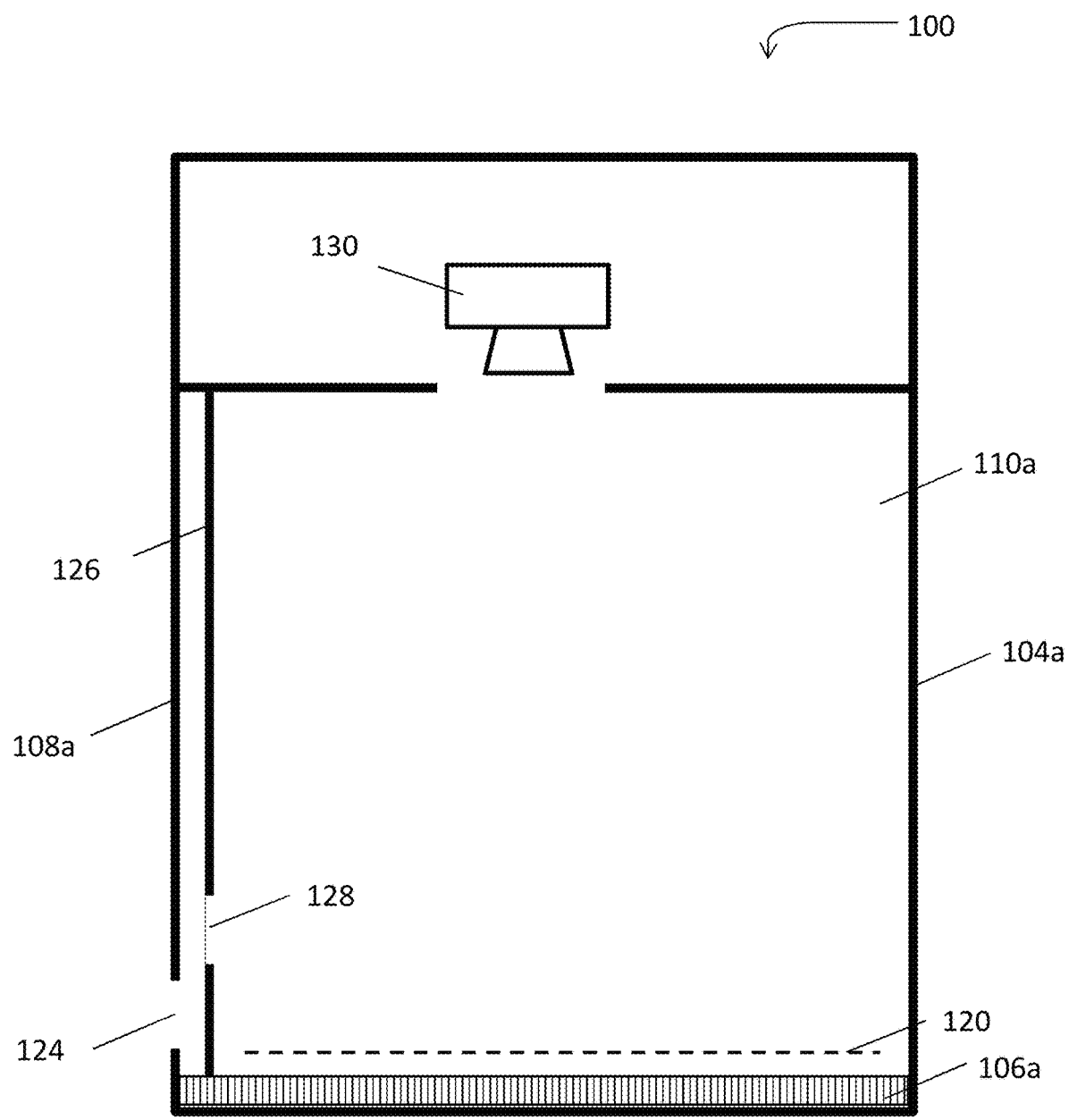
FIG. 8 is a cross-sectional schematic side view of a first chamber of a device for monitoring animal behavior according to one embodiment.

In some embodiments, as shown in FIG. 8, the chamber is arranged such that air may enter and exit the vent of each panel, while minimizing entry of light into the chamber via the vent. In some embodiments, as shown this view, the chamber includes a secondary panel 126 that may be placed inside of and spaced from the rear panel 108a. In such embodiments, the secondary panel 126 may include a vent 128, similar to the vent 124 in the rear panel, that allows air to travel into the chamber. However, as shown in this view, the vent 128 of the secondary panel is offset from the vent 124 in the rear panel. In this regard, the secondary panel may block light entering through the vent 124 in the rear panel, while allowing air to travel through the vents 124, 128 in the rear panel and secondary panel.

In some embodiments, the vent 124 in the rear panel may be vertically offset from the vent 128 in the secondary panel. For example, as shown in FIG. 8, the vent in the secondary panel is positioned a greater distance from the base 106a than the vent 124 in the rear panel 108a. As will be appreciated, the vents 124, 126 also may be horizontally offset. In some embodiments, the number of vent in the rear panel and secondary panel may be the same, as shown in FIG. 8, although they may be different. For example, the rear panel may have one larger vent, while the secondary panel has four smaller vents. The shape and size of the vents on the rear panel and the secondary panel may be the same or they may be different. For example, the secondary panel may have four circular vents offset from the substantially rectangular vent in the rear panel.

Similar to the rear panel, the door also may be arranged to allow air to pass through the vent while minimizing or eliminating light from passing into the chamber. In this regard, the door may have a first vent formed in an outer surface and a second vent formed in the inner surface, the vents being offset from one another. As with the above, the vents in the inner and outer door surfaces may be the same shape and size, or may differ. The door also may have the same number of vents on the inner and outer surfaces, or they may be different.

In some embodiments, like that shown in FIG. 8, when a secondary panel is positioned inside of the rear panel 108a, the strip(s) of testing lights 120 may be attached to the secondary panel 126 instead of to the rear panel. In this regard, in instances when one or more lights have failed, the secondary panel may be removed from the enclosure to repair the lights.

As shown in FIGS. 7 and 8, the chamber 102a may include an image capture device 130, such as a video camera, for recording rodent behavior. As shown in FIG. 7, in some embodiments, the video camera may be located above the container 122 holding rodents for the testing. For example, the camera may be centered (e.g., longitudinally and laterally) with respect to the chamber. In some embodiments, the camera may be mounted to a cross bar (not shown) extending at a top of the chamber. The camera also may be attached to the chamber via other suitable methods.

Although the camera 130 is shown as being located directly above the rodents for recording behavioral data, the camera may be located in other suitable locations, such in a upper corner or on one of the side panels of the chamber. In other embodiments, the camera may be located below the base. As will be appreciated, in such embodiments, the base of the chamber may be transparent such that the camera may record rodent behavior from below the base. Although a single video camera is shown in each chamber, one more cameras may be arranged in each chamber for recording rodent behavior. For example, in embodiments in which multiple containers are placed in the chamber, more than one camera may be placed above the containers to record behavioral data. In other embodiments, a camera may be place above and below the rodents in a single container.

Figure 9:
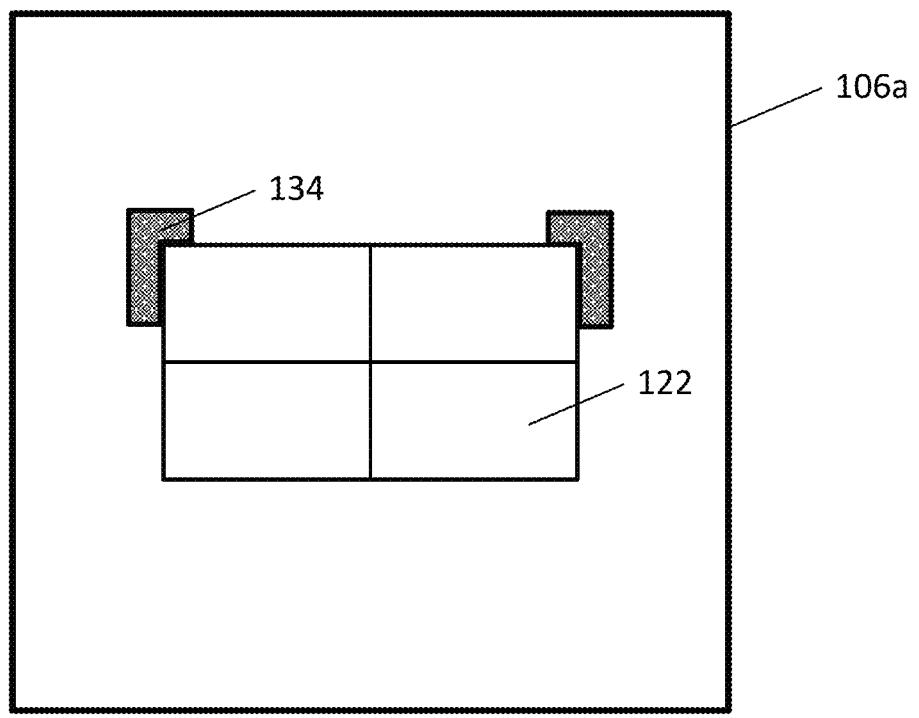
FIG. 9 is a top view of a base of a first chamber holding a container with corrals for housing rodents according to one embodiment.

As shown in FIG. 9, in some embodiments, the base of the enclosure is arranged to assist the investigator in properly aligning the container 122 below the camera 130 for monitoring rodent behavior. For example, the container may be centered below the camera, such that there are no observable blind spots on the recording. In some embodiments, as shown in FIG. 9, the base 106a may include one or more alignment members, such as alignment tabs 134, arranged to align the container 122 in a desired location under the camera. In some embodiments, the alignment tabs 134 include substantially "L" shaped pieces of plastic that are attached to the base. In some embodiments, the tabs 134 are arranged to center the container 122 (e.g., longitudinally and laterally) on the base. As will be appreciated, other alignment methods may be used for properly positioning the container on the base. For example, the base may include a glass etching or other marking on the base to indicate to the proper position of the container 122 on the base.

As will be appreciated, in embodiments in which more than one container is placed in the chamber, the base of the chamber may include two sets of alignment tabs arranged to position each of the containers in the chamber.

Turning back to FIG. 2, in some embodiments, the container 122 includes one or more corrals 136 within which one or more rodent 138 may be housed during a study. As shown in this figure, the corral 136 may include an open field which allows the rodent to freely move.

Although the container 122 is shown with four corrals 136 in this view, in other embodiments, the container may have only a single corral, or may have 2, 3 or more than 4 corrals. As will be appreciated, although two rodents are shown in each corral, each corral may have one or more rodents. Also, the number of rodents may vary from corral to corral. For example, a single rodent may be placed in a first corral while two rodents may be placed in another corral. Without wishing to be bound by theory, by having a device configured to allow multiple rodents 138 to be housed in the same corral, and to monitor the behavior of each of the freely moving rodents 138, experiments relating to the social interactions, e.g., social anxiety, of the rodents 138 may be conducted.

As will be appreciated, rodents need not be inserted in each of the corrals during an experiment. For example, in a container having four corrals, rodents may be placed in only two of the corrals during monitoring. In a similar fashion, in embodiments in which more than one container is placed in a chamber, the number of corrals in each container may be the same or they vary from container to container. For example, a first container may have only one corral while a second container may have four corrals.

In some embodiment, the container may allow different experiments to be conducted in each corral. In this regard, the device 100 may be configured such that all the corrals 102 begin an experiment at the same time, although the device 100 may be configured such that the experiment being performed in each corral 102 begins at a different time. This may improve consistency in the testing, e.g., by allowing all the experiments to begin after the same amount of time has passed after each rodent has been genetically modified or stimulated instead of starting the experiments after different periods of time have passed.

In some embodiments, the containers are open at an upper surface. In other embodiments, the container includes a box that is closed at all sides. In such embodiments, the container may include a cover that is placed on top of the box once the rodents are inserted in the corrals. In such embodiments, the container may include one or more cooling elements to maintain an appropriate temperature of the container. For example, the container may include vents for allowing air to pass into and out of each of the corrals in the closed box. Similar to the chambers, and as shown in FIG. 7, each corral 136 may have one or more vents 138 for allowing air to pass into and out of the corral. In some embodiments, the vents are at least partially offset from one or more vents formed in an inner panel or inner panel portion so that light cannot penetrate the inside of the container. As will be appreciated, the vents may be positioned in any suitable location.

In some embodiments, the containers are open at an upper surface. In other embodiments, the container includes a box that is closed at all sides. In such embodiments, the container may include a cover that is placed on top of the box once the rodents are inserted in the corrals. In such embodiments, the container may include one or more cooling elements to maintain an appropriate temperature of the container. For example, the container may include vents for allowing air to pass into and out of each of the corrals in the closed box. Similar to the chambers, and as shown in FIG. 7, each corral 136 may have one or more vents 137 for allowing air to pass into and out of the corral. In some embodiments, the vents are at least partially offset from one or more vents formed in an inner panel or inner panel portion so that light cannot penetrate the inside of the container. As will be appreciated, the vents may be positioned in any suitable location.

In some embodiments, the container is removable from the chamber. In such embodiments, the container may be washable once testing has finished and the rodents have been removed. In some embodiments, by being removable, the investigators may choose the container that best matches the experiment being conducted. For example, the investigator may choose a container with the desired number of corrals for the experiment(s) being conducted. In this regard, the container may be part of a kit, including a plurality of containers from which the investigators may choose one or more containers for testing. In other embodiments, the kit may include a single container with a plurality of removable partitions. In such embodiments, the investigator can assemble one or more partitions to obtain the desired number of corrals in the container Although the container is shown as being removable from the chamber in these embodiments, it will be appreciated that the container also may be fixedly attached to the base in other embodiments. For example, the container may be screwed, glued, press-fit or snap fit into the base. In such embodiments, the investigator may slide at least a portion of the base out of the chamber to add rodents into one or more corrals of the container, and then slide the base back into the chamber for testing.

Although embodiments have been shown and described in which the rodents are illuminated from lights positioned above the base, with behavioral data being recorded via an image device positioned above the rodents, other types of natural behavioral data and testing may be performed via the device 100 shown in FIG. 1. For example, in some embodiments (see FIG. 10), the device may be arranged such that a surface on which the rodents are moving may be sensitive to the rodent's paw print, toe print, or other inferior surface of the rodent.

Figure 10:
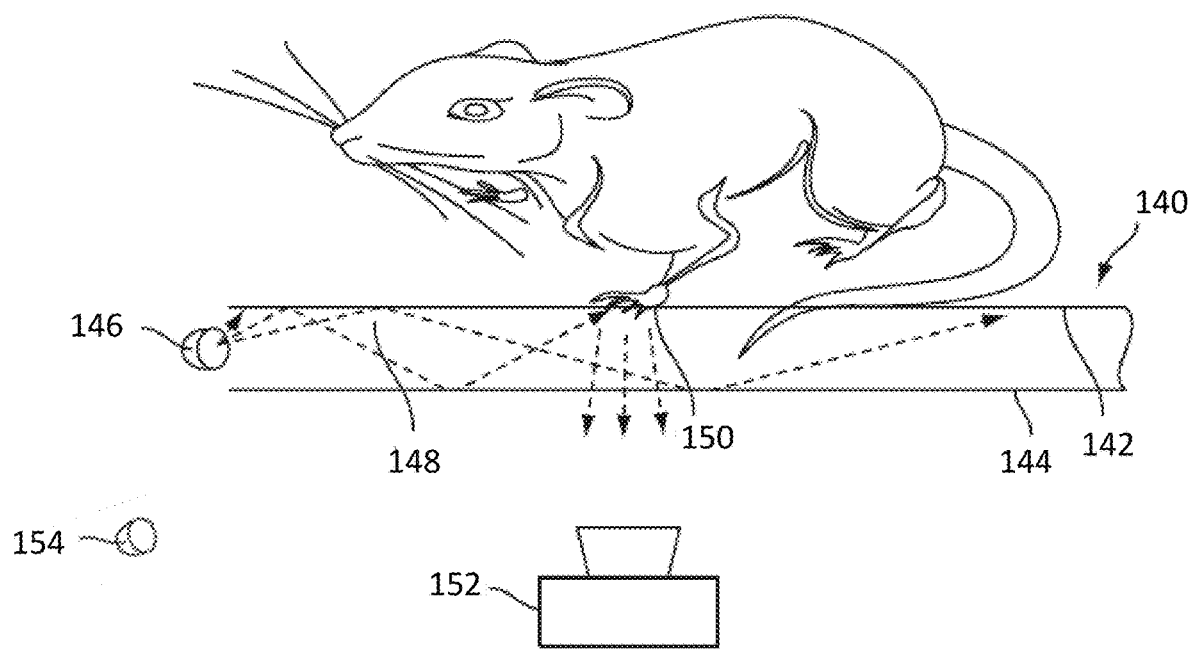
FIG. 10 is cross-sectional side view of a base surface of a container in a device for monitoring animal behavior according to one embodiment.

As shown in FIG. 10, the base surface 140 on which the rodent 138 moves may be arranged to be sensitive to the rodent's paw print, toe print, or other inferior surface of the rodent. In such embodiments, the container 122 may be placed in one or more channels formed in the base, the channels projecting light into the base surface of the container, as will be described. In some embodiments, the base surface 140 may be a transparent surface which allows observation of the rodent from below the device container. For purposes herein, a transparent/clear surface may include a surface capable of allowing visible and/or non-visible light to pass therethrough. In some embodiments, the base surface 140 is also the sensor.

As shown in FIG. 10, the base surface 140 includes an upper base surface 142 and a lower base surface 144. In some embodiments, the base surface 140 is a glass, acrylic, or silicone material, although other suitable materials may be used as this aspect of the disclosure is not limited in this regard. In some embodiments, all or portions of the upper base surface 142 includes a textured surface which acts as a stimulus for the rodent(s) in the corral.

As shown in FIG. 10, FTIR lights 146, such as LEDs, may be positioned around the perimeter of the base surface 140. In some embodiments, the lights 146 are mounted in channels or rails in the base, the lights projecting the light into the base surface 140 of the container 122. In such embodiments, the lights 146 may be easily separated from the rest of the chamber for replacement of broken parts and to allow for optimal positioning of lights relative to an edge of the surface 140. In other embodiments, the lights 146 may be positioned as strip lights around the edge of the base surface 140.

In some embodiments, the FTIR lights 146 emit light which may include a non-visible band light, e.g. near-infrared, infrared, or ultraviolet light, or another suitable type of light. As shown in FIG. 10, the light emitted by the lights 146 is totally internally reflected (see e.g. at 148). When a rodent's footprint, toe print, or other inferior surface comes into contact with the upper base surface 142, e.g. at 150, the internally reflected light becomes frustrated and is refracted out of the base surface 140 via the bottom base surface 144. Such reflected light may be captured by a secondary image capture device, such as camera 152.

Without wishing to be bound by theory, analyzing data illuminated from FTIR-generated lights can be difficult because the feature being illuminated (e.g., the animal's hind paw) is not always readily identifiable. The inventors have realized that by illuminating the animal to identify the feature, in addition to illuminating the feature with FTIR-generated lights, improve behavioral analysis of the animal may be achieved. In some embodiments, as shown in FIG. 10, a secondary light source, such as lights 154, may be used to illuminate the animal from beneath the base surface of the container, with the FTIR light source 146 still projecting FTIR-light into the surface 140. As will be appreciated, although the lights 154 are shown below the animal in this figure, the secondary light source may be located in other suitable locations in other embodiments, such as above the container. In some embodiments, the secondary light source may be of uniform in color and intensity.

In some embodiments, to optimize the data, a lighting configuration from the secondary light source 154 may be used to dimly illuminate the head, body, tail and paws to provide visual cues as to the identity and position of the FTIR-generated signal. Dim lighting may permit a freely behaving animal to be uniformly illuminated without generating any visible light or reflections of light in the field of view beyond the animal from the viewpoint of the capturing device. As will be appreciated, visible light may otherwise serve as a stimulus for the animals and disrupt the testing. In contrast dim lighting with little to no visible reflections limits the amount of stimulus to the animal. As will be appreciated, as the container may be made of a red transparent material, the rodents may not be able to see certain wavelengths of light that may be used to illuminate the head, body, tail and paws of the rodent.

While lighting the animal from beneath may provide the relative positions and identify of one of the head, body and tail of the animal, this added light also may reduce the dynamic range (e.g., the fidelity) of the FTIR signal, and thus, limit its utility. For example, when the second light 154 is turned on to identify a feature (e.g., a paw) of the animal, it may be difficult to determine when, and the extent to which, that feature (e.g., the paw) makes contact with the sensor. That is, when both the first and second lights 146, 154 are turned on, the changes in luminance caused by different pressures being exerted by the paw on the surface may be more difficult to discern. For example, in some instances, the luminance for the feature (e.g., the paw) may appear to be the same or nearly the same throughout. In contrast, with only FTIR illumination, the timing of this event, and the extent to which the paw is making contact, is obvious because the variations in luminance are clearly visible.

The inventors have recognized that by using different lighting schemes to generate images of the body for feature identification and images of the footprint for visualizing changes in luminance caused by different pressures being exerted by the feature (e.g., the paw), various advantages may be realized. For example, in one embodiment, the secondary light source may be turned on to illuminate the body for feature identification and then turned off, leaving only the FTIR lights on to visualize changes in luminance when the feature makes contact with the base surface. As will be appreciated, lighting schemes also may be used in which the secondary light source is alternated between dim and bright lights. For example, a bright light may be used to illuminate the animal's feature, after which point the secondary light source is dimmed again. As will be appreciated, such a dim light may remain on when the FTIR illumination is used to illuminate the animal's paw print.

In some embodiments, to maintain the full dynamic range of the FTIR signal, the under lighting (e.g., the secondary light source) may be turned on only on alternating or for intermittent video frames. For example, the light may be turned on when a first video frame of the body is captured and then turned off when a second video frame showing the change in luminance is captured. The lights below the animal also may be turned on and then turned off for intermittent periods of time that are not necessarily cued by the video frames. For example, the image capturing device may capture a video in which the under lighting is intermittently turned on and off. As will be appreciated, in such embodiments, the same outcome may be accomplished, with either a global shutter video camera or a camera with a rolling shutter. In some embodiments the underlighting may be NIR LEDS, although other suitable light sources may be used.

In some embodiments, this illumination strategy may permit recording of separable data streams of the same animal behavior from one capturing device 152 (e.g., a video camera), with one data stream being used for dynamic range of FTIR-generated foot position data and the other being used for orientation and analysis of body position. In addition to the data stream from the secondary capturing device 152, the capturing device 130 above the rodents also may record anther video stream.

In one embodiment, the device includes a switch that utilizes the "shutter" signal generated by the camera to identify the duration and timing of the video frames. A software-based counter is then employed to control the secondary light source beneath the animal, turning it on only for the duration of frame exposure of periodic subsequent video frames such as every other frame, every $10^{th}$ frame, every $100^{th}$ frame, or after another suitable number of frames. In some embodiments, video frames are taken 5 ms apart, 10 ms apart, 15 ms apart, although other suitable time delays may be used. In such embodiments, there may be 50 frames taken per second. There also may be 180 frames taken per second.

Although a secondary light source has been described for use in determining the relative identity and position of the animal's features, other suitable methods may be used. For example, in another embodiment, only the FTIR light source may be used to gather both the identity and position of the features and the contact luminance. That is, a high intensity FTIR reading may be taken to show the relative position and identity of the rodent. Then, the typical FTIR reading, showing contact luminance. A single light source also may be used to take all readings in embodiments having two different capturing devices (e.g., cameras), each with different filters—a first to view the position and identity and a second to determine the contact luminance. Or a single capturing device below the rodents (e.g., camera) may be used with the two noted filters.

In other embodiments, the position and identity of the animal's features may be done via another tracking method. For example, the animal may be tagged (e.g., an RFID tag or some other tag) and the device may include a sensor to track the position of the animal and capture FTIR-illuminated data when the animal has changed positions.

In some embodiments, the secondary capturing device 152 may be located below the lower base surface 144 for capturing the refracted light. In some embodiments, the capturing device 152 may be located in the enclosure 102 of the device. The capturing device 152 may cooperate with the base surface 140 to capture a profile of the rodent's full footprint, toe print when the rodent is standing on its toes, or other inferior surface (e.g., the rodent's abdomen).

In some embodiments, the image capturing device 152 is a camera for recording the movement of the rodent or rodents. The camera may be a near-infrared camera in some embodiments, although other types of cameras may be employed as this aspect of the disclosure is not limiting. Without wishing to be bound by theory, the type of capturing device 152 corresponds to the type of band light emitted by the lights 146. For example, in embodiments in which a near-infrared band light is emitted by the lights 146, a near-infrared camera is used.

In some embodiments, the device 100 is configured such that images of the topographical features representing the inferior surface of each freely roaming rodent or rodents in a single corral 136 may be separately analyzed. Without wishing to be bound by theory, the behavior of the rodent(s) may be compared with either or both the behavior of other rodent(s) in the same corral 136 and the behavior of any rodent(s) in other corrals.

Turning back to FIG. 1, in some embodiments, the enclosure may have one or more control panels 134, such as touch screen control panels, for controlling various parameters of the device 100. In some embodiments, the control panels 134 are located on the front of the enclosure, such as above the first chamber. In some embodiments, there is a single control panel for the entire device, while, in other embodiments, there may be a separate control panel for each of the chambers. In some embodiments, the investigator may control operation one or more of the camera by pressing one or more buttons on the control panel.

In some embodiments, the device 100 may be connected to one or more control devices, which may be used to control the device (e.g., the camera). The control device may be a computer (desktop or laptop), such as computer 132, a tablet, a mobile device, or any other suitable apparatus for controlling the device 100. In some embodiments, the device 100 may be connected to the control via a USB connection or via an internet, intranet, wireless, or other network. In some embodiments, each of the cameras may be connected to the control device. The control device may run an application configured to store the images collected by the image capture device 130 and to process the images and/or convert the images into another data format for analysis. Other processing and/or analysis also may be performed by the device 100 itself and/or by the control device. In such embodiments, the camera may be connected, such as via a wired or wireless connection, to the control panel 134.

In some embodiments, behavioral data recorded by the camera 130 is transferred to a to the computer 132. Data may then be transferred from the computer to the investigator. Data also may be transferred from the camera to another storage media, such as to a secured digital (or SD) card. In such embodiments, the SD card may be connected to the camera, such as via a port or card reader (not shown). The card may be inserted prior to running the experiment and thereafter be removed once the testing is completed. As will be appreciated, other types of storage media may be used to store behavior data recorded from the camera.

In embodiments in which data is transferred to a storage media such as the SD card, the device may include one or more ports into which the SD card (or other portable memory) may be inserted. In some embodiments, the ports may be located on the control panel. In some embodiments, once the SD card is inserted into the port, the investigators need only press a single button on the control panel to enable testing and monitor rodent behavior.

Figure 11:
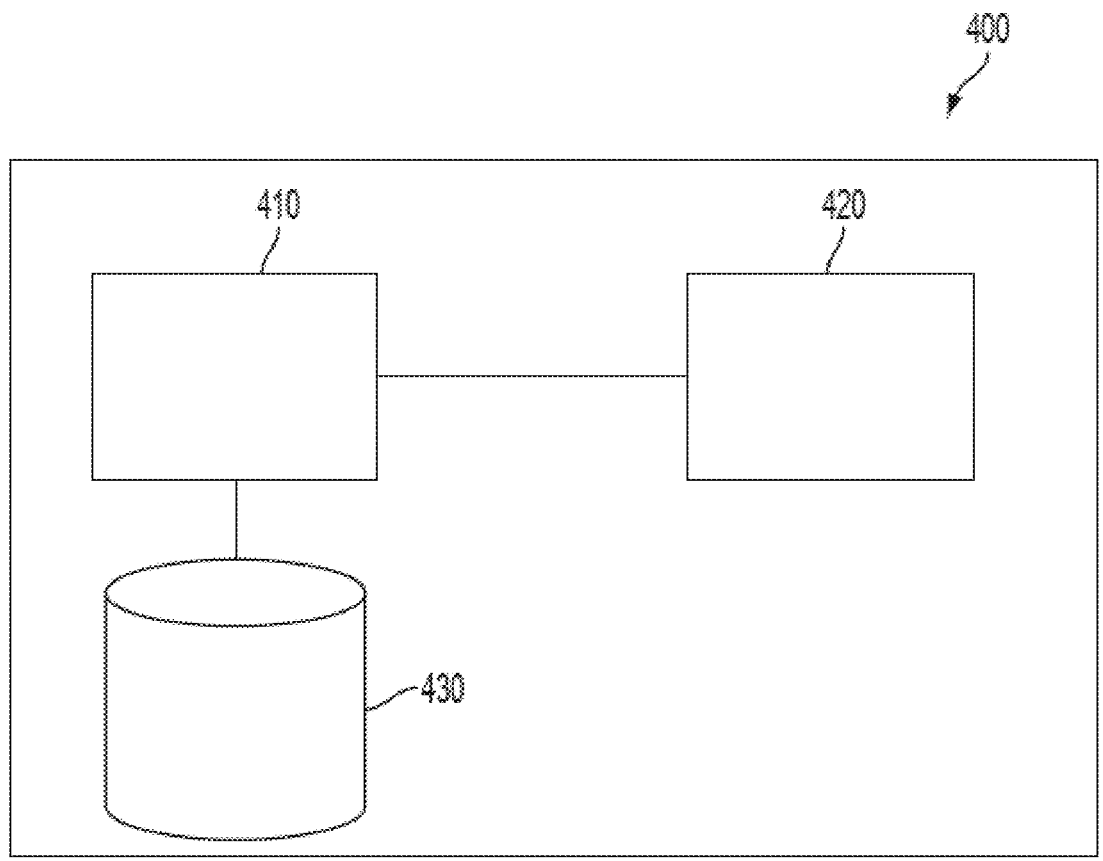
FIG. 11 is a schematic view of a computing system according to one embodiment.

The control device in accordance with the techniques described herein may take any suitable form, as aspects of the present invention are not limited in this respect. An illustrative implementation of a computer system 400 that may be used in connection with some embodiments of the present invention is shown in FIG. 11. One or more computer systems such as computer system 400 may be used to implement any of the functionality described above. The computer system 400 may include one or more processors 410 (e.g., processing circuits) and one or more computer-readable storage media (i.e., tangible, non-transitory computer-readable media), e.g., volatile storage 420 (e.g., memory) and one or more non-volatile storage media 430, which may be formed of any suitable non-volatile data storage media. The processor(s) 410 may control writing data to and reading data from the volatile storage 420 and/or the non-volatile storage device 430 in any suitable manner, as aspects of the present invention are not limited in this respect. To perform any of the functionality described herein, processor(s) 410 may execute one or more instructions stored in one or more computer-readable storage media (e.g., volatile storage 420), which may serve as tangible, non-transitory computer-readable media storing instructions for execution by the processor 410.

The above-described embodiments of the present invention can be implemented in any of numerous ways. For example, the embodiments may be implemented using hardware, software or a combination thereof. When implemented in software, the software code (e.g., instructions) can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of embodiments of the present invention comprises at least one computer-readable storage medium (i.e., at least one tangible, non-transitory computer-readable medium, e.g., a computer memory, a floppy disk, a compact disk, a magnetic tape, or other tangible, non-transitory computer-readable medium) encoded with a computer program (i.e., a plurality of instructions), which, when executed on one or more processors, performs above-discussed functions of embodiments of the present invention. The computer-readable storage medium can be transportable such that the program stored thereon can be loaded onto any computer resource to implement aspects of the present invention discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed aspects of the present invention.

In using the device, in one exemplary embodiment, at least a subset of a group of rodents is obtained and placed in one or more corrals of the container. For purposes herein, a subset of rodents may include one or more rodents. In some embodiments, a first subset of rodents is placed in the corral and a second subset of rodents are placed into a second corral. As will be appreciated, the rodents may be genetically modified or otherwise stimulated prior to placement in the corral. There also may be proteins or other molecules given to the rodent.

Next, the container may be inserted into the chamber, onto the respective base, and the chamber door may be closed. As noted above, by closing the door, the testing lights (e.g., the strip(s) of LED at or near the base of the chamber may be illuminated. The investigator may then turn on the camera positioned above the container to begin monitoring the behavior of the rodents in the chamber. In such embodiments, rodents in the corrals may be observed freely roaming. In some embodiments, multiple rodents may be placed in the same corral to observe social interactions between the rodents.

In instances where FTIR analysis is being performed, in addition to or in place of the above, light may be transferred into the base surface of the container and paw print data may be recorded. If part of the testing, stimulus (e.g., light stimulus, thermal stimulus, noise stimulus) may be applied to the rodents. The rodents also may be exposed to different smells. The applied stimulus may be delivered through the base surface in some embodiments, although, in other embodiments, the stimulus may be delivered through alternate methods.

For devices performing a study using multiple rodents (whether in the same corral or in different corrals), the rodents may be stimulated with the same stimulus or with different stimuli. Additionally, the animals may receive only one stimulus or several different stimuli. The device also may be configured such that the rodents are tested for short periods of time and/or for extended periods of time.

The behavior of the rodents, both before and after the stimulus, may be observed by imaging the spatial extent and intensity of signal of the footprint, toe print, and/or other inferior surface of the animal in response to the stimulus and its change over time. For example, in some embodiments, the rodents may get anxious and stand up on their toes creating a distinctive footprint, which differs from the more flattened footprint created when the rodents have settled down. The image is generated as a result of contact between the footprint or toe print, or other inferior surface of the rodent, and the base surface, which frustrates the band light and causes the light to be reflected and to exit the base surface for detecting by the capturing device. The capturing device captures the illuminated areas on the base surface and these images are collected and analyzed.

In some embodiments, the capturing device may capture rodent behavior for short and/or long periods of time. For example, the capturing device may record rodent behavior for between about 10 seconds and 5 minutes. The capturing device also may capture images for between 5 and 10 minutes or even for more than 10 minutes. For example, the capturing device may capture rodent behavior for 20 minutes, 30 minutes, 40 minutes, an hour, 2 hours, or even up to 24 hours.

Although embodiments have been shown and described as measuring the behavior of one or more rodents, it will be appreciated that the device also may be used to measure behavior of other animals (e.g., dogs and cats) or for humans. For example, the device may be sized so that an individual may stand or walk on the surface to analyze his or her gait. The device also may be used to analyze only a portion of an individual's body. For example, a smaller device may be used to analyze an individual's handprint when only an individuals' hand is placed on the surface.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A device for recording animal behavior, the device comprising:
   an enclosure having first and second chambers, each of the first and second chambers having exterior panels formed of an opaque material;

at least one image capture device disposed in each of the first and second chambers, the at least one image capture device arranged to capture behavior data of one or more freely roaming rodents;

a first container insertable into one of the first and second chambers and positioned below a respective image capture device, the first container having one or more corrals into which one or more rodents are housed during testing, the container being formed of a transparent material;

one or more fans configured to remove air from within the enclosure; and two or more air intake covers and/or panels, each air intake cover and/or panel including a vent allowing air to be drawn into the enclosure, wherein the vents of adjacent air intake covers and/or panels are misaligned from one another so as to prevent substantially all environmental light from entering the chamber.

2. The device of claim 1, wherein each of the first and second chambers includes a base, the first container being placed on the base of the one of the first and second chambers.

3. The device of claim 2, wherein the base includes one or more alignment tabs arranged to align the first container on the base.

4. The device of claim 2, wherein each of the chambers includes one or more lights arranged to emit at least one of an infrared, near infrared or other non-visible light for illuminating the one or more rodents.

5. The device of claim 4, wherein the one or more lights are positioned at or near the base.

6. The device of claim 5, wherein the one or more lights are positioned at or near the base on a rear panel and one or more side panels.

7. The device of claim 4, wherein the one or more lights are positioned above the container.

8. The device of claim 1, wherein each of the first and second chambers includes one or more vents.

9. The device of claim 8, wherein the one or more vents is formed in at least one of a rear panel and a front panel.

10. The device of claim 1, wherein each of the first and second chambers includes a door, the doors of the first and second chambers being movable between open and closed positions.

11. The device of claim 10, wherein when the door of the first chamber and/or the second chamber is closed, environmental light is prevented from entering the associated chamber.

12. The device of claim 10, wherein a first door arranged to close the first chamber is attached to a second door arranged to close the second chamber via a pulley system.

13. The device of claim 1, further comprising a second container having one or more corrals into which rodents are housed for testing.

14. The device of claim 13, wherein the first and second containers are both inserted into the first chamber.

15. The device of claim 13, wherein the first container is inserted into the first chamber and the second container is inserted into the second chamber.

16. The device of claim 1, wherein each of the first and second chambers includes one or more lights for emitting visible light.

17. The device of claim 1, further comprising an intermediate chamber disposed in between the first and second chambers, the intermediate chamber not being used for monitoring.

18. The device of claim 1, wherein the enclosure includes one or more control panels arranged to control the device.

19. The device of claim 1, wherein the first container is formed of a red transparent material, the one or more rodents being unable to see through the red transparent material.

20. The device of claim 1, wherein the first container includes one or more vents.

21. The device of claim 1, wherein the at least one image capture device disposed in each of the first and second chambers is attached to the respective chamber and is separate from the first container.

* * * * *